March 29, 1927. 1,622,551

L. A. UMANSKY

POWER TRANSMITTING SYSTEM

Filed May 26, 1925

Inventor:
Leonid A. Umansky,
by
His Attorney.

Patented Mar. 29, 1927.

1,622,551

UNITED STATES PATENT OFFICE.

LEONID A. UMANSKY, OF SCHENECTADY, NEW YORK, ASSIGNOR TO GENERAL ELECTRIC COMPANY, A CORPORATION OF NEW YORK.

POWER-TRANSMITTING SYSTEM.

Application filed May 26, 1925. Serial No. 33,036.

My invention relates to a system and apparatus for efficiently taking care of the power given out from or supplied to the secondary windings of coil wound secondary induction machines incident to their regulation above or below synchronism.

It is known that when a coil wound secondary induction machine operates as a motor below synchronism, energy is given out from its secondary, the amount depending upon the load and the reduction of speed below synchronism. If the machine operates as a motor above synchronism energy must be supplied to its secondary. If the machine operates as a generator, energy must be supplied to its secondary when operating below synchronism and energy will be given out from its secondary when operating above synchronism. This energy takes the form of alternating current having a voltage and frequency proportional to the change of speed above or below synchronism and will hereinafter be referred to as slip energy. Regulating systems are known where this secondary or slip energy is conveyed through regulating machines or sets to or from the shaft of the machine being regulated or to or from the primary source of energy. Where a wound secondary induction machine is associated with another or other power dynamo electric machine and it is desired to regulate their speed or loads independently, I have discovered that certain economies may be obtained in accordance with my invention by transferring this slip energy from one machine to the other directly through regulating apparatus. My invention is particularly advantageous in connection with the electric drive of rolling mills or similar apparatus where one or more of the motors are of the wound secondary induction type.

The features of my invention which are believed to be novel and patentable will be pointed out in the claims appended hereto.

Figure 1:
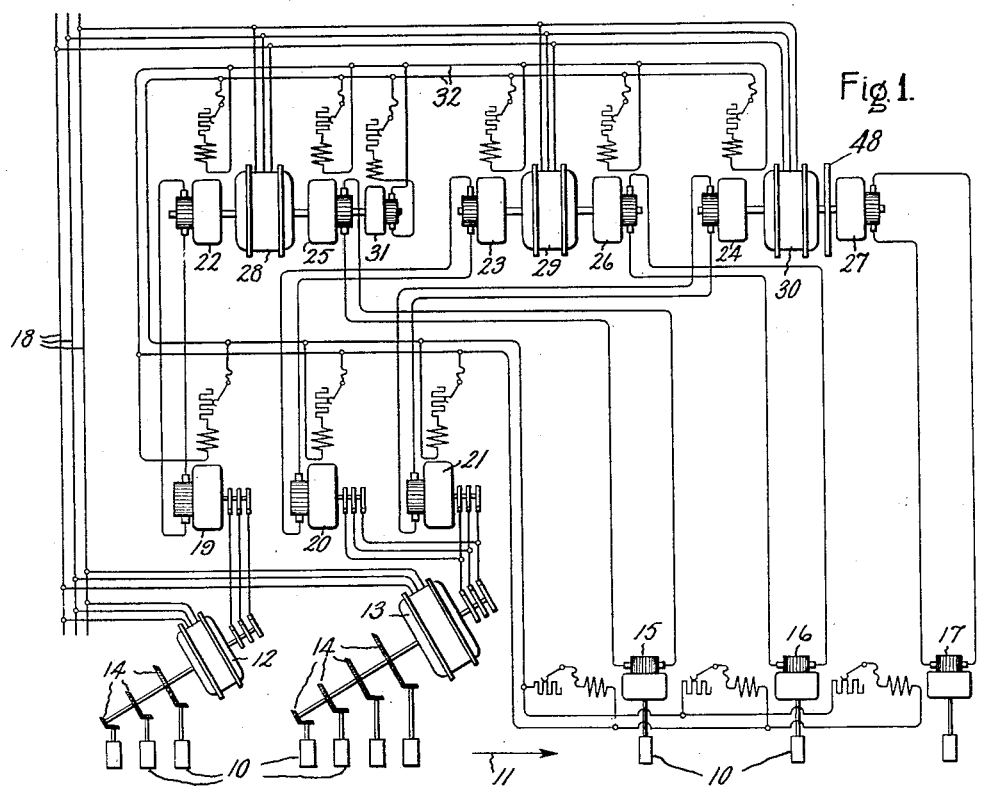
Figure 2:
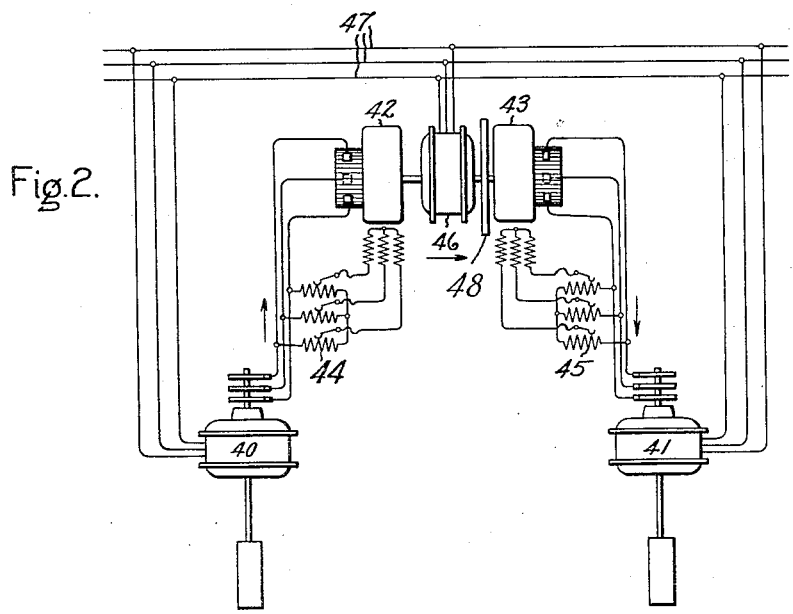

In the accompanying drawings I have represented two modifications of the invention, Fig. 1 representing the electrical equipment for a rolling mill in which the slip energy of induction motors driving certain parts of the mill is utilized for driving direct current motors of other parts of the mill, the energy being transferred through suitable regulating apparatus by means of which the speed of the various motors may be independently regulated; Fig. 2 represents two induction motors, one arranged to operate through a regulating range below synchronism while the other operates through a regulating range above synchronism in which the output slip energy of the first motor is transmitted through regulating apparatus for both motors and utilized as the input slip energy for the second motor.

Referring to Fig. 1 of the drawing, 10 represents the various rolls of an electrically driven rolling mill, the direction of movement of the material operated upon being indicated by the arrow 11. As the material passes through the mill its size is reduced and its speed increased; consequently it is desirable that the speeds at which the various rolls are driven be graduated accordingly. The speeds of the rolls at various parts of the mill should also be capable of relative adjustment in order to take care of different kinds of material, the amount of reduction desired, variations in temperature, etc. This is particularly true of the finishing rolls which should be capable of very fine relative speed adjustment. It is expedient and satisfactory to operate in this case the first two groups of rolls represented in the drawing by two individual induction motors 12 and 13, the difference in speed of the rolls in each group being taken care of by the difference in ratio of the gears 14 interposed between the motor shafts and the rolls which they drive. The three finishing rolls are driven by individual direct current motors 15, 16 and 17.

In accordance with my invention, the induction motors are of the wound secondary type and the slip energy contingent on regulation, is utilized to supply the direct current motors 15, 16 and 17. In this modification the two induction motors are arranged for subsynchronous operation and the speed regulation is accomplished by a modification of the well known Kraemer system. The primaries of the induction motors are supplied from the source 18 and their secondaries are connected through slip rings to alternating current ends of synchronous converters 19, 20 and 21, converter 19 being connected to the secondary of motor 12 and converters 20 and 21 being connected in parallel to the secondary of the larger motor 13. The direct current ends of the three converters 19, 20 and 21 are respectively connected to direct current machines 22, 23 and 24. Mounted on the same shaft with the direct current machine 22 is a second direct current machine 25 which supplies energy to the direct current motor 15. An exciter 31, which supplies an exciter bus 32 for separate excitation of the various direct current machines, as illustrated, is also driven with machine 25. The direct current ends of converters 20 and 21 are similarly electrically connected with direct current motors 23 and 24 respectively and these direct current machines drive direct current generators 26 and 27 respectively, supplying energy to the direct current motors 16 and 17.

It will now be apparent that the output slip energy from induction motor 12 is conveyed through the regulating apparatus 19, 22 and 25 and utilized to drive motor 15. It will be evident that this energy may be more or less than that required by motor 15 at various times and in order to take care of this differential energy the direct current motor generator set also includes an alternating current motor 28 electrically connected to the alternating current supply lines 18. The same provision is made with the other regulating sets by means of alternating current machines 29 and 30. When the output slip energy of motor 12 is in excess of that required to operate motor 15, machine 28 becomes a generator and this excess energy is pumped back into the alternating current supply system. When the output slip energy is insufficient for the operation of the motor 15, machine 28 becomes a motor to supply the necessary additional energy directly from the alternating current system 18. The machine 28 may be an induction or synchronous machine. In many cases it will be desirable to design the induction machine 28 for high slip so as to take advantage of the fly wheel effect of the regulating set or of an additional fly wheel connected to the regulating set as indicated at 48 in equilizing the flow of power from motor 12 to motor 15. The adjustment of the field of machine 22 will control the speed of motor 12 in accordance with the well known Kraemer system and the adjustments of the field windings of the direct current machines 25 and 15, or either of them, will control the speed of motor 15 in a well understood manner.

It is seen that the alternating current machine 28 needs to be only of sufficient capacity to take care of the difference in energy given out from the secondary of motor 12 and that supplied to motor 15 plus the losses in the regulating equipment. This differential energy may be kept at a low value by properly proportioning the relative capacities of motors 12 and 15 as regards the average slip energy available and by properly proportioning the fly wheel effect of the regulating set 22, 28 and 25 to compensate for the relative variations in load on the two motors 12 and 15. It will be noted that in this case the flow of energy through the regulating apparatus is in the same direction as the movement of the mechanical load of the rolling mill; that is to say, at the beginning of a pass of the ingot or other material through the mill, motor 12 is first loaded up and furnishes slip energy to the regulating set, and more or less of this energy is stored up in increasing the speed of the regulating set 22, 28, 25. Then there will be a period of operation when motors 12 and 15 are both loaded and finally, as the ingot passes motor 12, only motor 15 is loaded at which time more or less of the energy of momentum stored in the regulating set will be delivered as electrical energy to motor 15. Ordinarily where the slip energy of an induction machine is utilized it is either transferred back to the shaft of the motor being regulated or else pumped back in alternating current supply lines. In the latter case the machine corresponding to machine 28 must be of a larger capacity than is necessary with the present invention, and if other direct current apparatus is to be supplied from the system, a separate motor generator set was provided heretofore. It will thus be seen that the present invention effects a saving both in energy and in the equipment.

The same general plan is carried out with the remaining part of the equipment illustrated in Fig. 1 except that the slip energy of motor 13 is divided in this case between two regulating sets respectively supplying energy to the last two finishing motors 16 and 17. When the rolling mill load is light, one of these sets, together with the corresponding rotary converter may be shut down.

In Fig. 2 I have represented another modification of my invention in which induction machines 40 and 41, of the wound secondary type, are used to drive different parts of the same machine, or they may drive entirely separate machines. It is here assumed that when one machine is operating below synchronism, the other will be operating above synchronism. For the sake of simplicity the equipment considered desirable for passing through synchronism has been omitted since it constitutes no part of the invention and is well known. Let us assume that machine 40 operates in a speed regulating range below synchronism and that machine 41 operates in a speed regulating range above synchronism. If both machines are motors, slip energy will necessarily flow out from the secondary of machine 40 and slip energy must be supplied to the secondary of machine 41. In accordance with my invention the output slip energy of machine 40 is utilized as the input slip energy of machine 41. To this end the secondary of machine 40 is electrically connected through slip rings to an alternating current commutator machine 42 which is mechanically connected to a second alternating current commutator machine 43. The latter is electrically connected to the secondary slip rings of machine 41. Machines 42 and 43 are similar and are capable of operating either as motors or as generators. The fields of these machines are respectively excited from the secondary circuits with which they are associated so that their frequencies always correspond to the slip frequency of such circuits. The regulation is accomplished by means of adjustable transformers 44 and 45 between the field windings of machines 42 and 43 and the secondary circuits of machines 40 and 41 respectively. The characteristics of these alternating current commutator machines are in general similar to those of direct current shunt machines. By the adjustment of the transformers 44 and 45 the slip energy of the machines 40 and 41 may be regulated with a corresponding regulation of their speeds. Machine 42 operates as a motor and drives machine 43 as a generator and the transfer of energy is in the direction indicated by the arrows.

In order to take care of the difference between the energy given out from the secondary of motor 40 and that required by the secondary of motor 41 due to different regulating conditions, the alternating current machine 46 is provided on the same shaft with the two commutator machines. This machine 46 is electrically connected to the alternating current supply lines 47 which supplies the two machines 40 and 41. Machine 46 will act as a motor or as a generator accordingly as the slip energy of motor 40 is less or greater than that required by motor 41. The machine 46 may be designed to utilize the fly wheel effect of this regulating set or of an additional fly wheel coupled to the regulating set as indicated at 48 where that is desirable.

The two machines 40 and 41 might be used as induction generators with the same speed arrangement in which case the flow of power through the regulating set would be reversed. The same equipment might be used where both machines 40 and 41 operate below or above synchronism, one as an induction generator and the other as an induction motor.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States is:—

1. In combination, a plurality of induction machines of the wound secondary type, a load regulating machine for each induction machine connected to control the slip energy thereof, said load regulating machines being mechanically connected together.

2. In combination, a plurality of induction machines of the wound second type, a load regulating machine for each induction machine connected to control the slip energy thereof, said load regulating machines being mechanically connected together, and a dynamo electric machine mechanically connected to said regulating machines for supplying energy to or absorbing energy from said regulating machines.

3. In combination, a source of supply a pair of wound secondary induction motors supplied thereby, a commutator type dynamo electric machine concatenated with each induction motor for independently regulating the slip energy of said motors, said two regulating machines being mechanically connected together and to a third dynamo-electrical machines supplied from said source.

4. In combination, a pair of induction machines of the wound secondary type one of which is arranged to operate so as to give out slip energy and the other of which is arranged to operate so as to require slip energy, a regulating machine for each induction machine connected to control the slip energy thereof, said regulating machines being mechanically connected together so that the slip energy given out from one induction machine may be utilized for supplying the slip energy to the other induction machine.

5. The combination claimed in claim 4, characterized by the fact that the two regulating machines are mechanically coupled with a dynamo-electrical machine provided to take care of differences between the slip energies of the two wound secondary induction machines.

6. The combination claimed in claim 4, characterized by the fact that the rotating parts of the two regulating machines are mechanically connected with the rotor of a high slip induction machine and with a fly wheel.

7. In combination, a pair of induction machines of the wound secondary type one of which is arranged to operate above synchronism and the other of which is arranged to operate below synchronism, a regulating machine for each induction machine connected to regulate the slip energy thereof, said regulating machines being mechanically connected together so as to enable the slip energy of one induction machine to be utilized in the other induction machine, and means for taking care of differences between the slip energies of said induction machines.

8. In combination, an induction motor of the wound secondary induction type, dynamo electric regulating apparatus for controlling the flow of slip energy in the secondary circuit of said induction motor, a generator driven from said dynamo electric regulating apparatus and a second motor mechanically independent of said induction motor supplied directly from said generator.

9. In combination, an induction motor of the wound secondary type, dynamo electric regulating apparatus for controlling the flow of slip energy in the secondary circuit of said motor, a generator mechanically coupled with said dynamo electric regulating apparatus, a second motor mechanically independent of said induction motor supplied directly from said generator, and a dynamo-electrical machine mechanically coupled with said generator for taking care of the difference between the slip energy and that required by said second motor.

10. In combination, a source of alternating current supply, an induction motor of the wound secondary type supplied from said source, a dynamo electric regulating machine for controlling the slip energy of said induction machine, a generator driven by said regulating machine, another dynamo-electric machine mechanically coupled with said regulating machine and generator and electrically connected to said source of supply, and a second motor supplied directly from said generator.

11. In combination, an induction motor of the wound secondary type, a three unit fly wheel motor generator set comprising a regulating machine for controlling the slip energy of said induction motor, a high slip induction machine and a generator and a second motor supplied directly from said generator.

12. An electric motor drive installation comprising a wound secondary induction motor and a second motor both independently operating upon a common load, means for regulating the slip energy of said induction motor to control the load thereof and means for delivering the slip energy thus used for regulation to supply said second motor.

13. An electric motor drive installation comprising a pair of motors operating independently of each other, at least one of said motors being of the wound secondary induction type, means for regulating the slip energy of said induction motor, means for transferring the energy thus used in regulation to the other motor, and energy storing means included in said energy transferring means for momentarily absorbing the slip energy in excess of that required by said second motor and thereafter delivering it to said second motor when its power requirements increase above the available slip energy.

14. In a motor drive installation a source of alternating current supply, a pair of motors at least one of which is of the wound secondary induction type, means for controlling the slip energy of said induction motor, means for delivering the slip energy incident to such regulation to supply the other motor, means included in said slip energy regulating and supplying means for momentarily storing such energy in excess of that required by said other motor and thereafter delivering it to said other motor when its power requirements increase above the available slip energy, and means for supplying slip energy back to said alternating current supply when the available slip energy is in excess of that required by said other motor and the energy storing means and for delivering energy from said alternating current supply to said other motor when its energy requirements are not otherwise available.

15. The method of utilizing the slip energy of a plurality of wound secondary mechanically independent induction machines which consists in operating said machines so that input slip energy is required by one machine and that out-put slip energy is delivered by another machine and transferring such slip energy from the secondary of one machine to the secondary of the other machine.

16. The method of utilizing the slip energy of a pair of mechanically independent induction motors of the wound secondary type which consists in operating one of said motors below synchronism and the other motor above synchronism and delivering the output slip energy of the first motor to the secondary of the second motor.

In witness whereof I have hereunto set my hand this 25th day of May 1925.

LEONID A. UMANSKY.

Certificate of Correction.

Patent No. 1,622,551.  Granted March 29, 1927, to

LEONID A. UMANSKY.

It is hereby certified that error appears in the printed specification of the above-numbered patent requiring correction as follows: Page 3, line 78, claim 2, for the word " second " read *secondary;* and that the said Letters Patent should be read with this correction therein that the same may conform to the record of the case in the Patent Office.

Signed and sealed this 17th day of May, A. D. 1927.

[SEAL.]

M. J. MOORE,
*Acting Commissioner of Patents.*